United States Patent
Nagato et al.

(10) Patent No.: US 9,268,074 B2
(45) Date of Patent: Feb. 23, 2016

(54) INTERFERENCE FILTER, DISPLAY DEVICE, AND DISPLAY DEVICE MANUFACTURING METHOD

(71) Applicant: KABUSHIKI KAISHA TOSHIBA, Minato-ku (JP)

(72) Inventors: Hitoshi Nagato, Kunitachi (JP); Takashi Miyazaki, Kawasaki (JP); Rei Hasegawa, Yokohoma (JP); Kouji Suzuki, Yokohama (JP); Masaki Atsuta, Yokosuka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/022,686

(22) Filed: Sep. 10, 2013

(65) Prior Publication Data

US 2014/0071534 A1    Mar. 13, 2014

(30) Foreign Application Priority Data

Sep. 11, 2012 (JP) ................................. 2012-199809

(51) Int. Cl.
  *G02B 5/28* (2006.01)
  *G02F 1/1335* (2006.01)
  *G02F 1/1362* (2006.01)

(52) U.S. Cl.
  CPC .......... *G02B 5/284* (2013.01); *G02F 1/133514* (2013.01); *G02F 2001/133521* (2013.01); *G02F 2001/136222* (2013.01)

(58) Field of Classification Search
  CPC ................... G02B 5/284; G02F 2001/136222; G02F 2001/133521; G02F 1/133514

USPC ......... 359/580–590, 577, 578, 579, 260, 261; 356/454, 505, 506, 519; 353/20
  See application file for complete search history.

(56) References Cited

U.S. PATENT DOCUMENTS

| 7,332,044 B2 * | 2/2008 | Sidorin et al. ................... 156/64 |
| 8,810,754 B2 * | 8/2014 | Nagato et al. ................... 349/105 |
| 2004/0095645 A1 * | 5/2004 | Pellicori et al. ................. 359/584 |
| 2007/0097509 A1 * | 5/2007 | Nevitt et al. ................... 359/584 |
| 2008/0062359 A1 * | 3/2008 | Inaba et al. ................... 349/105 |
| 2008/0142144 A1 * | 6/2008 | Sidorin ........................... 156/64 |
| 2013/0021556 A1 * | 1/2013 | Nagato et al. ................... 349/62 |
| 2013/0077029 A1 | 3/2013 | Nagato et al. |
| 2013/0188253 A1 * | 7/2013 | Nakai et al. ................... 359/584 |
| 2013/0242237 A1 * | 9/2013 | Nagato et al. ................. 349/105 |
| 2014/0071534 A1 * | 3/2014 | Nagato et al. ................. 359/590 |

FOREIGN PATENT DOCUMENTS

JP         8-320480        12/1996

* cited by examiner

*Primary Examiner* — Bumsuk Won
*Assistant Examiner* — Grant Gagnon
(74) *Attorney, Agent, or Firm* — Oblon, McClelland, Maier & Neustadt, L.L.P.

(57) ABSTRACT

According to one embodiment, a display device includes an interference filter including following layers, and a display layer. The first common layer includes first and second regions. The second common layer faces the first common layer. The first spacer layer is provided between the first and second common layers and includes first and second portions facing the first and second regions. The thickness of the first portion is different from the thickness of the second portion. The second spacer layer faces at least one of the first and second portions through the second common layer and is made of the same material as that of the first spacer layer. The coating layer faces the second common layer through the second spacer layer.

15 Claims, 13 Drawing Sheets

REFERENCE
FIGURE

REFERENCE
FIGURE

REFERENCE
FIGURE

| | 200R(nm) | 200G(nm) | 200B(nm) |
|---|---|---|---|
| 209 — SiN$_X$ | 61.4 | 61.4 | 61.4 |
| 208 — SiO$_2$ | 91.0 | 91.0 | 91.0 |
| 207 — SiN$_X$ | 61.4 | 61.4 | 61.4 |
| 206 — SiO$_2$ | 91.0 | 91.0 | 91.0 |
| 205 — SiN$_X$ | 35.0 | 128.4 | 82.2 |
| 204 — SiO$_2$ | 91.0 | 91.0 | 91.0 |
| 203 — SiN$_X$ | 61.4 | 61.4 | 61.4 |
| 202 — SiO$_2$ | 91.0 | 91.0 | 91.0 |
| 201 — SiN$_X$ | 61.4 | 61.4 | 61.4 |

(210 = layers 206–209; 211 = layers 201–204; 200 overall)

REFERENCE FIGURE

REFERENCE FIGURE

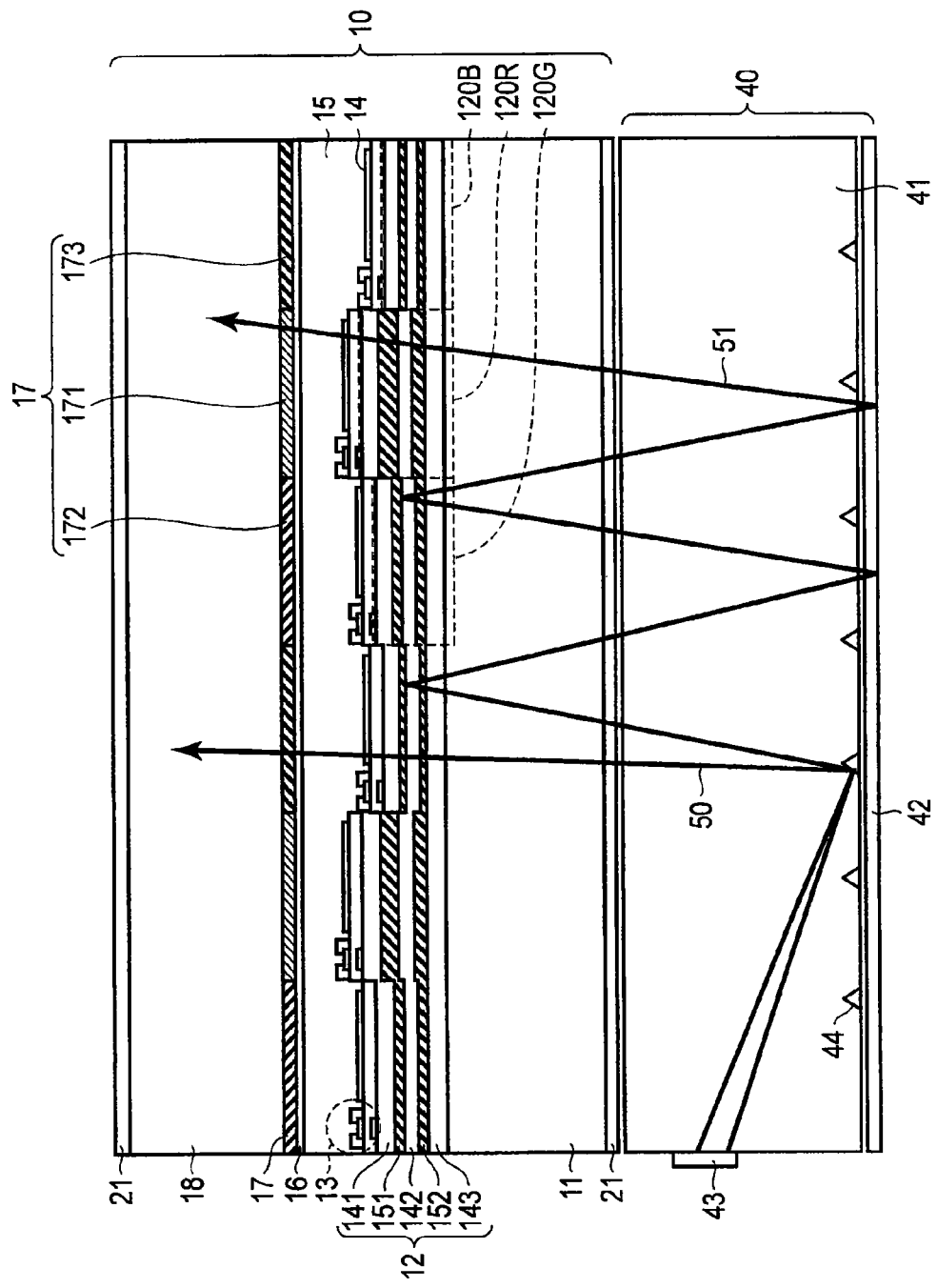

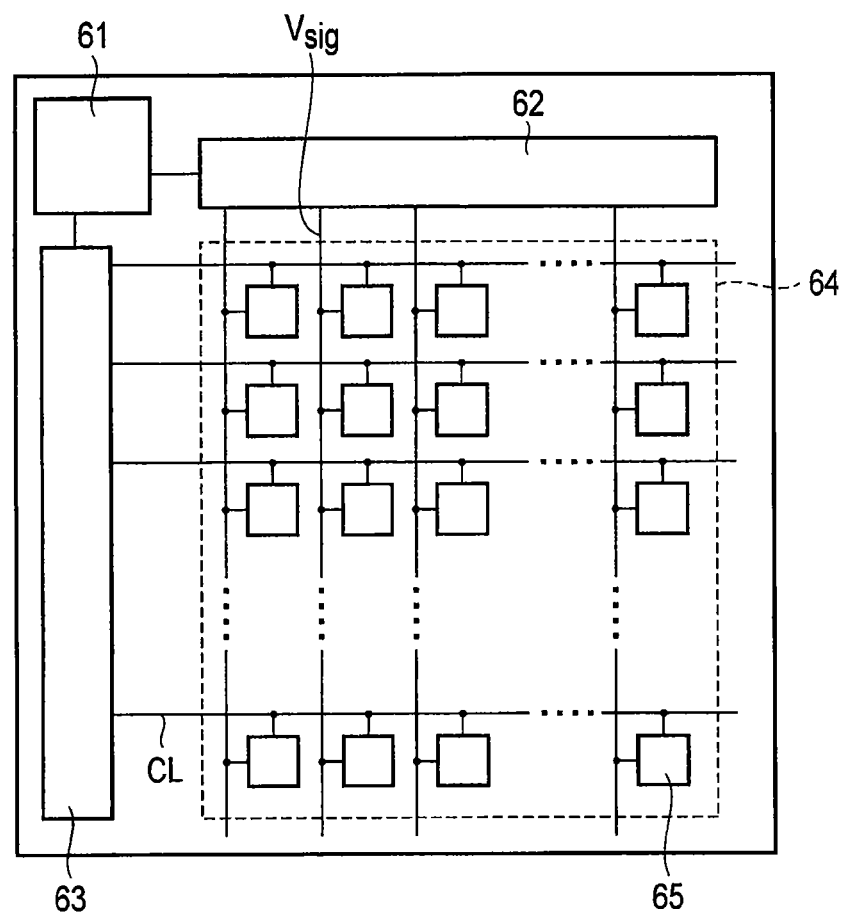
F I G. 5

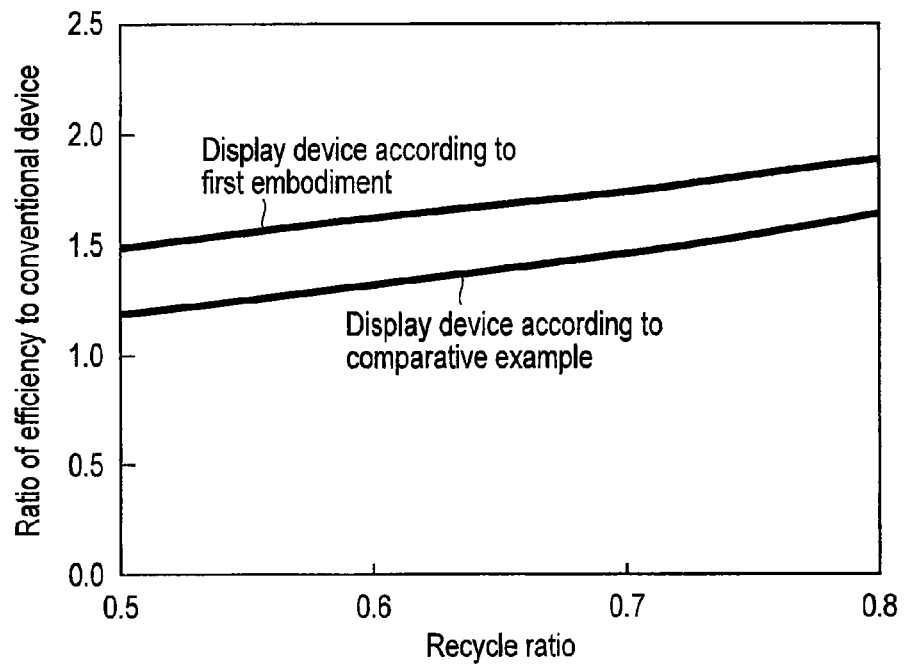
F I G. 8
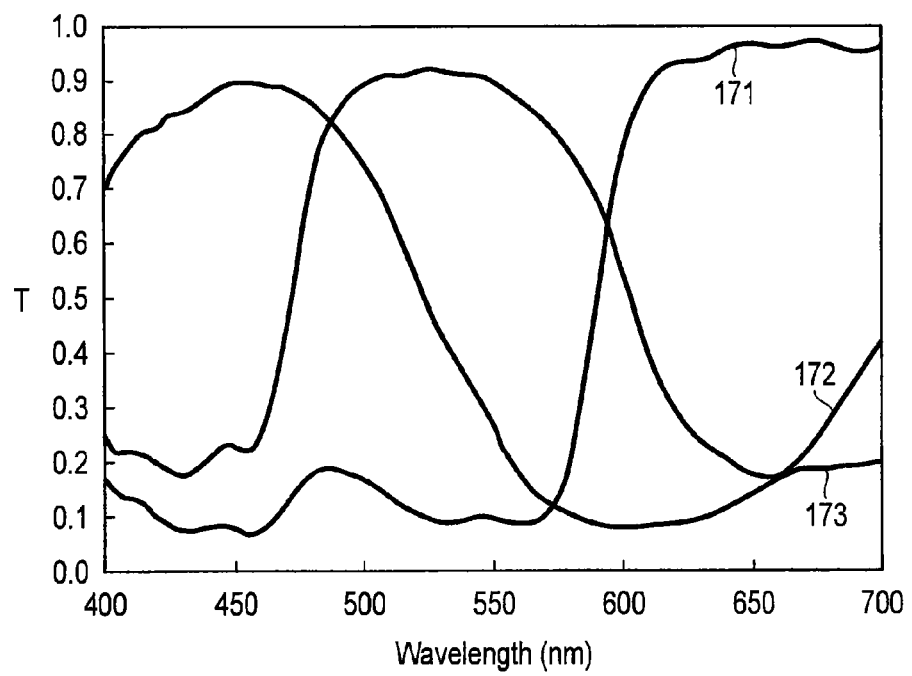
F I G. 9

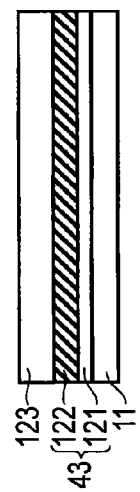
FIG. 10A
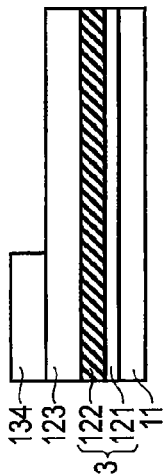
FIG. 10B
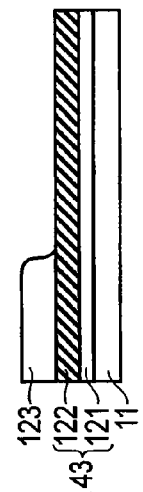
FIG. 10C
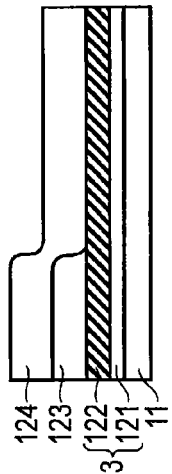
FIG. 10D
FIG. 10E
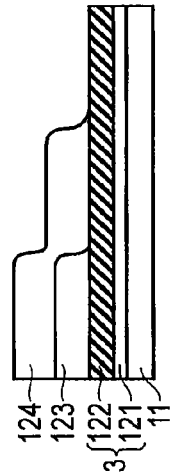
FIG. 10F
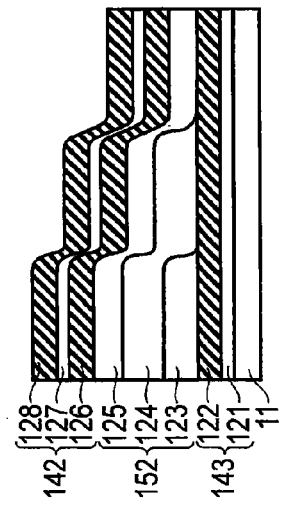
FIG. 10G

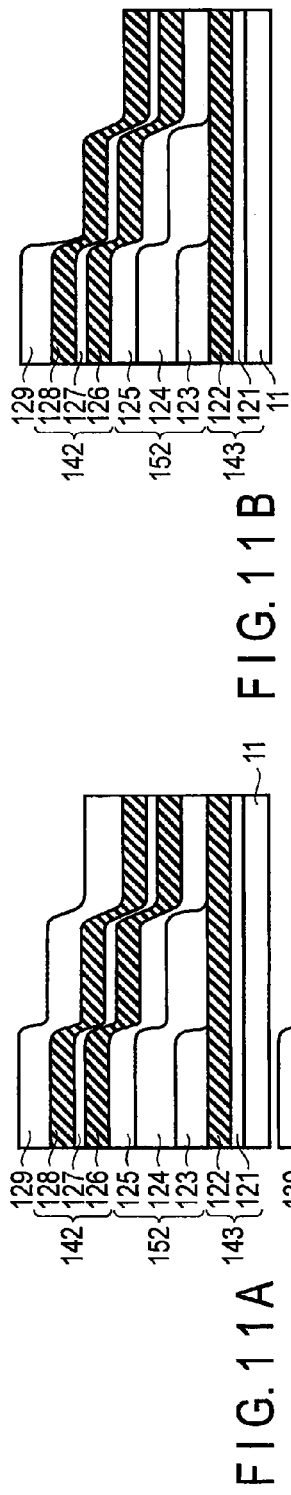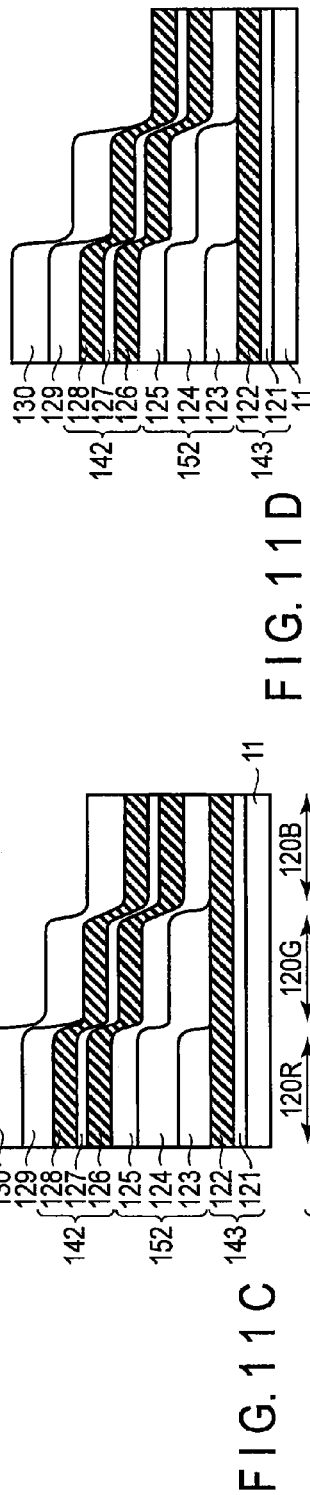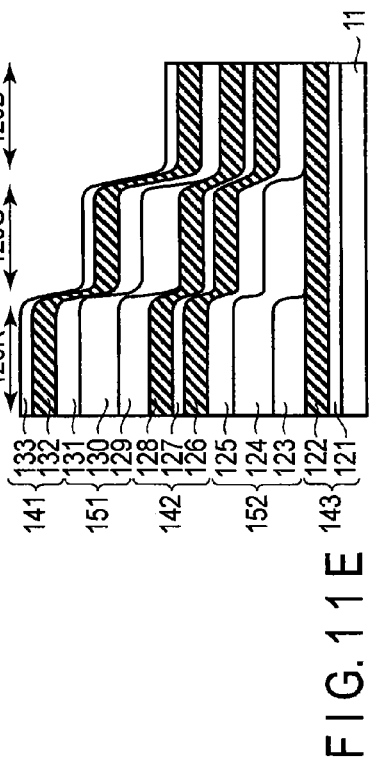

|  | 121B(nm) | 121G(nm) | 121R(nm) |
|---|---|---|---|
| 169 — SiO₂ | 73.0 | 73.0 | 73.0 |
| 168 — SiN_x | 51.4 | 51.4 | 51.4 |
| 167 — SiO₂ | 73.0 | 73.0 | 73.0 |
| 151 — SiN_x | 99.1 (151B) | 133.9 (151G) | 44.4 (151R) |
| 166 — SiO₂ | 85.0 | 85.0 | 85.0 |
| 165 — SiN_x | 63.4 | 63.4 | 63.4 |
| 164 — SiO₂ | 85.0 | 85.0 | 85.0 |
| 163 — SiN_x | 63.4 | 63.4 | 63.4 |
| 152 — SiN_x | 0.0 | 72.5 | 0.0 |
| 162 — SiO₂ | 0.0 | 89.0 | 0.0 |
| 161 — SiN_x | 0.0 | 37.4 | 0.0 |

(141 = {169, 168, 167}; 142 = {166, 165, 164, 163}; 143 = {162, 161})

F I G. 1 3 A

F I G. 1 3 B

| | 122B(nm) | 122G(nm) | 122R(nm) |
|---|---|---|---|
| 180 — SiO$_2$ | 0.0 | 89.0 | 0.0 |
| 143 { 179 — SiN$_x$ | 0.0 | 53.4 | 0.0 |
| 178 — SiO$_2$ | 0.0 | 89.0 | 0.0 |
| 152 — SiN$_x$ | 0.0 | 67.6 | 0.0 |
| 177 — SiN$_x$ | 59.4 | 59.4 | 59.4 |
| 176 — SiO$_2$ | 89.0 | 89.0 | 89.0 |
| 142 { 175 — SiN$_x$ | 59.4 | 59.4 | 59.4 |
| 174 — SiO$_2$ | 89.0 | 89.0 | 89.0 |
| 151 — SiN$_x$ | 89.1 (151B) | 127.0 (151G) | 32.8 (151R) |
| 173 — SiO$_2$ | 93.0 | 93.0 | 93.0 |
| 141 { 172 — SiN$_x$ | 55.4 | 55.4 | 55.4 |
| 171 — SiO$_2$ | 93.0 | 93.0 | 93.0 |
F I G. 14 A
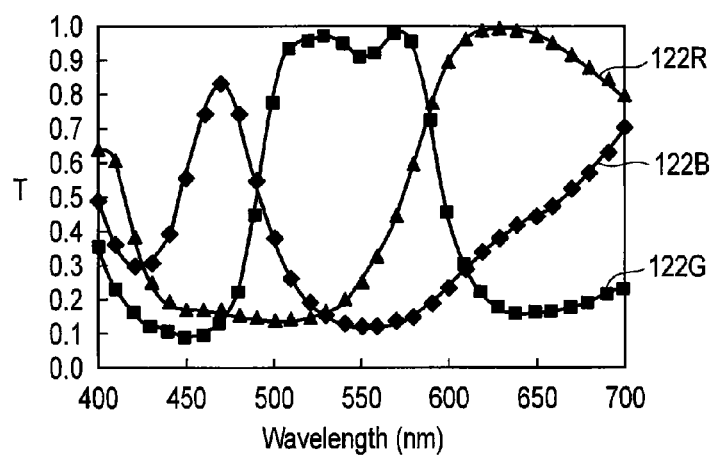
F I G. 14 B

INTERFERENCE FILTER, DISPLAY DEVICE, AND DISPLAY DEVICE MANUFACTURING METHOD

CROSS-REFERENCE TO RELATED APPLICATIONS

This application is based upon and claims the benefit of priority from Japanese Patent Application No. 2012-199809, filed Sep. 11, 2012, the entire contents of which are incorporated herein by reference.

FIELD

Embodiments described herein relate generally to an interference filter, a display device, and a display device manufacturing method.

BACKGROUND

The demand for display devices represented by a liquid crystal display, a plasma display, and an organic EL display is even more increasing as the digital terrestrial broadcasting has started, and the Internet and mobile phones have become popular. A color filter is arranged in such a display device. Color display is performed by red, green, and blue light components that have passed through the color filter. In general, a light absorption (absorption) color filter using pigments or dyes is used as the color filter. An absorption color filter transmits light in a specific wavelength region and absorbs light in other wavelength regions. For example, when white light enters a blue color filter, blue light components pass through the color filter, and green and red light components are absorbed by the color filter. This also applies to green and red color filters. Since the color filters absorb light, a loss of light occurs.

There is proposed a display device using an interference color filter in place of the absorption color filter. The interference color filter reflects light in wavelength regions other than a transmission wavelength region.

BRIEF DESCRIPTION OF THE DRAWINGS

FIG. 4 is a sectional view showing a display device according to the first embodiment;

FIG. 5 is a plan view showing the display device according to the first embodiment;

FIG. 8 is a view showing the characteristics of the display device according to the first embodiment and the display device according to the comparative example;

FIG. 9 is a view showing an example of the light transmission characteristic of an absorption filter according to the first embodiment;

FIGS. 10A, 10B, 10C, 10D, 10E, 10F, 10G, 11A, 11B, 11C, 11D, and 11E are sectional views showing a method of manufacturing the interference filter of the display device according to the first embodiment;

FIG. 14A is a view showing an example of an interference filter according to the third embodiment; and FIG. 14B is a view showing the light transmission characteristic of the interference filter shown in FIG. 14A.

DETAILED DESCRIPTION

Figure 1:
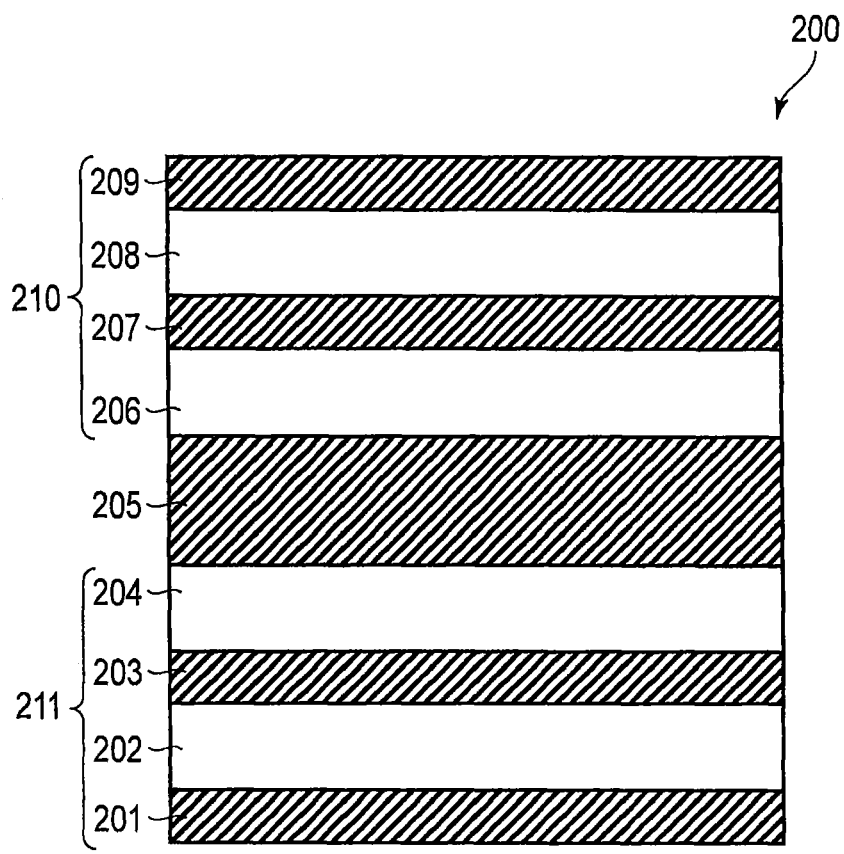
FIG. 1 is a sectional view showing an interference filter according to a comparative example.

In general, according to one embodiment, a display device includes an interference filter and a display layer facing the interference filter. The interference filter includes a first common layer, a second common layer, a first spacer layer, a second spacer layer, and a coating layer. The first common layer includes a first region and a second region. The second common layer faces the first common layer. The first spacer layer is provided between the first common layer and the second common layer and includes a first portion facing the first region and a second portion facing the second region. The first portion has a first thickness, and the second portion has a second thickness different from the first thickness. The second spacer layer faces at least one of the first portion and the second portion of the first spacer layer through the second common layer and is made of a same material as a material of the first spacer layer. The coating layer faces the second common layer through the second spacer layer. Each of the first common layer, the first spacer layer, the second common layer, the second spacer layer, and the coating layer is formed from a dielectric film.

According to another embodiment, an interference filter includes a first common layer, a second common layer, a first spacer layer, a second spacer layer, and a coating layer. The first common layer includes a first region and a second region. The second common layer faces the first common layer. The first spacer layer is provided between the first common layer and the second common layer and includes a first portion facing the first region and a second portion facing the second region. The first portion has a first thickness, and the second portion has a second thickness different from the first thickness. The second spacer layer faces at least one of the first portion and the second portion of the first spacer layer through the second common layer and is made of a same material as a material of the first spacer layer. The coating layer faces the second common layer through the second spacer layer. Each of the first common layer, the first spacer layer, the second common layer, the second spacer layer, and the coating layer is formed from a dielectric film.

According to another embodiment, there is provided a display device manufacturing method including forming an interference filter, and forming a display layer facing the interference filter. The interference filter includes a first common layer, a second common layer, a first spacer layer, a second spacer layer, and a coating layer. The first common layer includes a first region and a second region. The second common layer faces the first common layer. The first spacer layer is provided between the first common layer and the second common layer and includes a first portion facing the first region and a second portion facing the second region. The first portion has a first thickness, and the second portion has a second thickness different from the first thickness. The second spacer layer faces at least one of the first portion and the second portion of the first spacer layer through the second common layer and is made of a same material as a material of the first spacer layer. The coating layer faces the second common layer through the second spacer layer. Each of the first common layer, the first spacer layer, the second common layer, the second spacer layer, and the coating layer is formed from a dielectric film.

Hereinafter, various embodiments will be described in detail with reference to the accompanying drawings.

Note that the drawings are merely schematic and conceptual, and the relationship between the thickness and the width of each portion, the dimension ratio between the portions, and the like are not necessarily the same as in reality. In addition, the dimension or ratio may change between the drawings even for identical portions.

Note that the same reference numerals denote elements that are the same as those described concerning already mentioned drawings throughout the specification and drawings, and a detailed description thereof will be omitted appropriately.

A Fabry-Perot interference filter (interference color filter) is formed by stacking two or more kinds of dielectric films having different refractive indices. The wavelength region (transmission region) of light that passes through the Fabry-Perot interference filter is determined by the materials and thicknesses of the dielectric film and the number of stacked dielectric films. To manufacture an ideal interference filter having little loss of light, which transmits light in the transmission region almost 100% and reflects light in other wavelength regions (reflection regions) almost 100% upon receiving white light, dozens of dielectric films need to be stacked. Since the manufacturing process becomes very complex, manufacturing takes long time, and the production cost increases. This makes it difficult to mount the interference filter on inexpensive consumer appliances.

Before the description of the embodiments, an interference filter according to a comparative example will be explained. FIG. 1 is a sectional view showing an interference filter 200 according to a comparative example. The interference filter 200 includes nine dielectric films. More specifically, the interference filter 200 includes five silicon nitride films ($SiN_x$) 201, 203, 205, 207, and 209, and four silicon oxide films ($SiO_2$) 202, 204, 206, and 208 provided between the silicon nitride films. Out of the nine films, the four films on the upper side will be referred to as a first common layer 210, and the four films on the lower side will be referred to as a second common layer 211. The silicon nitride film 205 interposed between the first common layer 210 and the second common layer 211 will be referred to as a spacer layer. Changing the thickness of each layer enables to change the transmission region of the interference filter 200. For example, when the thickness of the spacer layer 205 is changed without changing the thicknesses of the first common layer 210 and the second common layer 211, the interference filter 200 can change the transmission region so as to transmit red light, green light, or blue light.

Figure 2A:
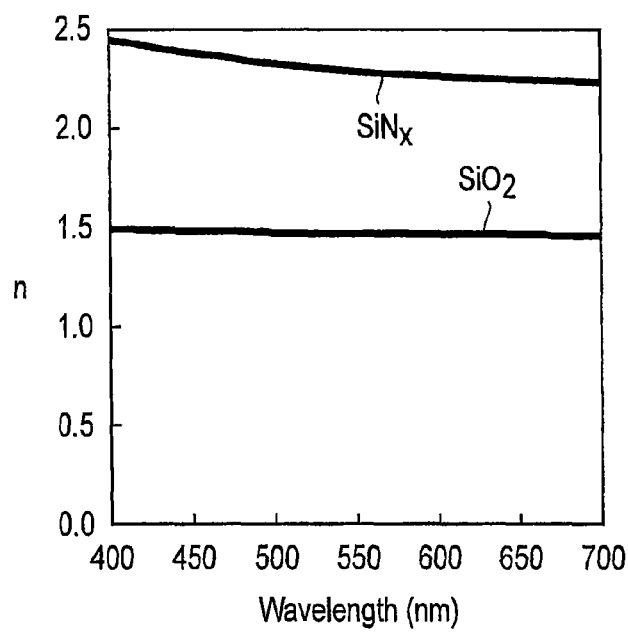
FIGS. 2A and 2B are views showing the characteristics of silicon nitride ($SiN_x$) and silicon oxide ($SiO_2$)
Figure 2B:
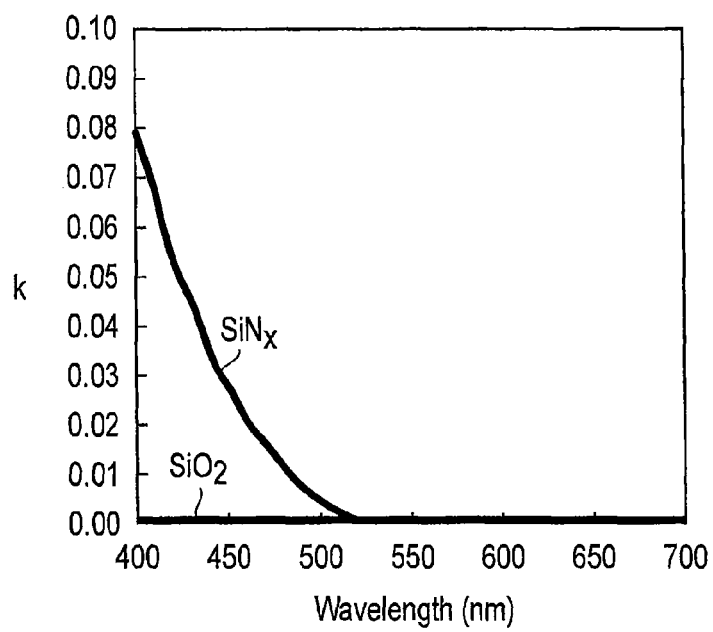

FIGS. 2A and 2B are graphs showing the optical characteristics of silicon nitride ($SiN_x$) and silicon oxide ($SiO_2$) used in the above-described comparative example and the embodiments to be described below. In FIG. 2A, the transverse axis represents the wavelength (unit: nm), and the vertical axis represents a refractive index n. In FIG. 2B, the transverse axis represents the wavelength (unit: nm), and the vertical axis represents an extinction coefficient k. As the silicon nitride film, a silicon nitride film whose refractive index near a wavelength of 550 nm is adjusted to 2.3 is used.

Figures 3A, 3B:
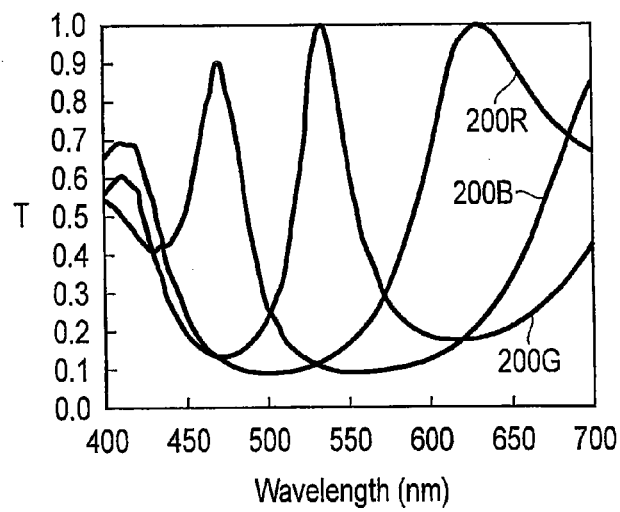
FIG. 3A is a view showing an example of the interference filter according to the comparative example.
FIG. 3B is a view showing the light transmission characteristic of the interference filter shown in FIG. 3A.

FIG. 3A is a table showing an example of the interference filter according to the comparative example, and shows the thicknesses (unit: nm) of nine films that form each of an interference filter (red interference filter) 200R that transmits red light, an interference filter (green interference filter) 200G that transmits green light, and an interference filter (blue interference filter) 200B that transmits blue light. For example, the red interference filter 200R is formed by stacking the 61.4-nm-thick silicon nitride film 201, the 91.0-nm-thick silicon oxide film 202, the 61.4-nm-thick silicon nitride film 203, the 91.0-nm-thick silicon oxide film 204, the 35.0-nm-thick silicon nitride film 205, the 91.0-nm-thick silicon oxide film 206, the 61.4-nm-thick silicon nitride film 207, the 91.0-nm-thick silicon oxide film 208, and the 61.4-nm-thick silicon nitride film 209 sequentially from the lower side. The green interference filter 200G is the same as the red interference filter 200R except that the thickness of the silicon nitride film 205 serving as a spacer layer is 128.4 nm. The blue interference filter 200B is the same as the red interference filter 200R except that the thickness of the silicon nitride film 205 serving as a spacer layer is 82.2 nm.

FIG. 3B is a graph showing the light transmission characteristics of interference filters 200R, 200G, and 200B shown in FIG. 3A. The transverse axis represents the wavelength (unit: nm) of light that passes through the interference filter, and the vertical axis represents a transmittance T. Because of the small number of stacked layers, the interference filter according to the comparative example is inexpensive and easy to manufacture, although the spectrum of the transmission region is narrow. In addition, since the transmittances of light components having wavelengths near, for example, 500 and 570 nm are low in all interference filters 200R, 200G, and 200B. When a color filter is formed using interference filters 200R, 200G, and 200B, the transmittances of light components are low near 500 and 570 nm in this color filter. That is, these light components are reflected by the interference filters and are hardly output from the display device. Hence, the light components are not used for display, resulting in a loss of light.

The interference filter ideally has a transmittance of zero in wavelength regions other than the transmission region. In interference filters 200R, 200G, and 200B, however, the transmittance is high in wavelength regions other than the transmission region. Hence, for example, light that passes through the green interference filter 200G includes light components of colors other than green. This leads to a decrease in the purity of the display color of the display device and a decrease in the color gamut.

The embodiments will be described below.

First Embodiment

A display device according to the first embodiment will be described. As the display device, a liquid crystal display will be exemplified. FIG. 4 is a sectional view showing the display device according to the first embodiment.

A display device includes a liquid crystal panel 10 and a backlight 40. The liquid crystal panel 10 includes a support substrate 11, an interference filter 12 provided on the support substrate 11, display circuits such as pixel driving transistors 13 and pixel electrodes 14 provided on the interference filter 12, a liquid crystal layer 15 that is a display layer provided on the display circuits and the pixel electrodes 14, a counterelectrode 16 provided on the liquid crystal layer 15, an absorption filter 17 provided on the counterelectrode 16, and a countersubstrate 18 provided on the absorption filter 17. A polarizing layer 21 is provided on a surface of each of the support substrate 11 and the countersubstrate 18 on a side not opposite to the liquid crystal layer 15.

The interference filter 12 includes a red interference filter (also called a first interference filter portion) 120R, a green interference filter (also called a second interference filter portion) 120G, and a blue interference filter (also called a third interference filter portion) 120B. The red interference filter 120R transmits light in the red wavelength region (first wavelength region) and reflects light in other wavelength regions including green and blue. The green interference filter 120G transmits light in the green wavelength region (second wavelength region) and reflects light in other wavelength regions including red and blue. The blue interference filter 120B transmits light in the blue wavelength region (third wavelength region) and reflects light in other wavelength regions including red and green. The red interference filter 120R, the green interference filter 120G, and the blue interference filter 120B are formed by stacking a plurality of dielectric films having different refractive indices. A detailed structure of the interference filter 12 will be described later.

Note that a wavelength region of light that passes through the interference filter indicates a wavelength region of a transmittance higher than those of other wavelength regions. A wavelength region of light that is reflected by the interference filter indicates a wavelength region of a reflectance higher (a transmittance lower) than those of other wavelength regions. For example, a wavelength region corresponding to the half width of the transmission spectrum of the interference filter can be the wavelength region of light that passes through the interference filter.

The absorption filter 17 includes a red absorption filter 171, a green absorption filter 172, and a blue absorption filter 173. One of the color absorption filters 171, 172, and 173 is provided in correspondence with each pixel. The red absorption filter 171 faces the red interference filter. The green absorption filter 172 faces the green interference filter. The blue absorption filter 173 faces the blue interference filter. The absorption filter 17 faces the interference filter 12 through the liquid crystal layer 15.

One pixel driving transistor 13 and one pixel electrode 14 are provided for each pixel. In addition, one kind of interference filter 12 and one kind of absorption filter are provided for each pixel. Although not illustrated, signal lines and scan lines are formed on the interference filter 12 as the display circuits. The pixel driving transistor 13 controls a voltage applied between the pixel electrode 14 and the counterelectrode 16.

When a voltage is applied between the pixel electrode 14 and the counterelectrode 16, the orientation of liquid crystal of the liquid crystal layer 15 provided between them changes so as to pass light or not. The liquid crystal panel 10 can thus perform image display by passing light from the backlight 40 or not for each pixel.

The support substrate 11 and the countersubstrate 18 are made of an optically transparent material such as glass or a transparent resin.

The interference filter 12 is a filter that transmits light in a specific wavelength region and reflects light in other wavelength regions. The interference filter 12 is formed from a plurality of dielectric films having different refractive indices. For example, the interference filter 12 is formed by alternately stacking layers of a high-refractive-index material and layers of a low-refractive-index material. Representative high-refractive-index dielectric materials are $TiO_2$, $Ta_2O_3$, $ZnO_2$, ZnS, $ZrO_2$, $CeO_2$, $Sb_2S_3$, and the like. Representative low-refractive-index dielectric materials are $SiO_2$, $MgF_2$, $Na_3AlF_6$, and the like.

As the pixel driving transistor 13, for example, a bottom gate type or top gate type thin film transistor is used. In one example, one pixel driving transistor 13 is arranged for each pixel.

The pixel electrodes 14 and the counterelectrode 16 are made of an optically transparent conductive material such as indium tin oxide.

The absorption filter 17 is a filter that transmits light in a specific wavelength region and absorbs light in other wavelength regions. The absorption filter 17 is formed using, for example, pigments or dyes.

The liquid crystal layer 15 is made of a material that changes the light transmittance between a state in which an electric field is applied and a state in which no electric field is applied. The polarizing layer 21 is formed from a polarizing film for polarizing light that has entered the liquid crystal layer 15 and light that has passed through the liquid crystal layer 15.

The backlight 40 includes a reflecting portion 42 facing the support substrate 11, a light guide portion 41 provided between the support substrate 11 and the reflecting portion 42, and a light source 43 provided on the side surface of the light guide portion 41. The light guide portion 41 has concave portions 44 on a side (bottom surface) facing the reflecting portion 42.

The light guide portion 41 is made of an optically transparent material such as an acrylic resin. As the light source 43, for example, an LED is used. The reflecting portion 42 is made of a material having a high light reflectance, for example, a metal such as aluminum. The concave portion 44 need only have at least one inclined surface with respect to the surface of the light guide portion 41 facing the reflecting portion 42, and can have, for example, a pyramidal shape or a ridge shape with a triangular section.

Light emitted by the light source 43 enters the light guide portion 41 and propagates through the light guide portion 41 while being totally reflected. At this time, when the light strikes the concave portion 44, the total reflection condition is broken down by the concave portion 44, and the light is reflected to the upper surface where the liquid crystal panel 10 is located. The reflected light exits from the light guide portion 41, passes through the support substrate 11, and enters the interference filter 12. Out of the light that has entered the interference filter 12, a light component in the transmission region of the interference filter passes through the interference filter 12 and then through the liquid crystal layer 15 and the absorption filter 17, and exits out of the liquid crystal panel 10, as indicated by a light beam 50.

On the other hand, out of the light that have entered the interference filter 12, almost all light components outside the transmission region of the interference filter are reflected and returned to the side of the backlight 40. For example, a light beam 51 indicates an example of a red light component. This light component propagates through the light guide portion 41 while being continuously totally reflected by the bottom surface of the light guide portion 41 and the green or blue interference filter. Upon reaching the red interference filter 120R, the light component passes through the red interference filter 120R and then through the liquid crystal layer 15 and the absorption filter 17, and exits out of the liquid crystal panel 10.

As described above, the interference filter 12 absorbs light little as compared to the absorption filter 17. For this reason, almost all light components from the backlight 40 can pass through the interference filters 12 of all colors, and little loss of light occurs.

FIG. 5 is a plan view showing the display device according to the first embodiment.

The display device includes a display region 64 in which a plurality of pixel portions 65 are provided in a matrix, and a signal line driving circuit 62, a control line driving circuit 63, and a controller 61 which are provided around the display region 64. The controller 61 is connected to the signal line driving circuit 62 and the control line driving circuit 63 and controls the operation timings of the signal line driving circuit 62 and the control line driving circuit 63.

The signal line driving circuit 62 and the pixels 65 are connected by a plurality of signal lines Vsig provided along the column direction in FIG. 5. The control line driving circuit 63 and the respective pixels 65 are connected by a plurality of control lines CL provided along the row direction in FIG. 5. The signal line driving circuit 62 supplies signal voltages to the pixel portions 65 through the signal lines Vsig. The control line driving circuit 63 supplies scan line driving signals to the pixel portions 65 through the control lines CL.

Figure 6A:
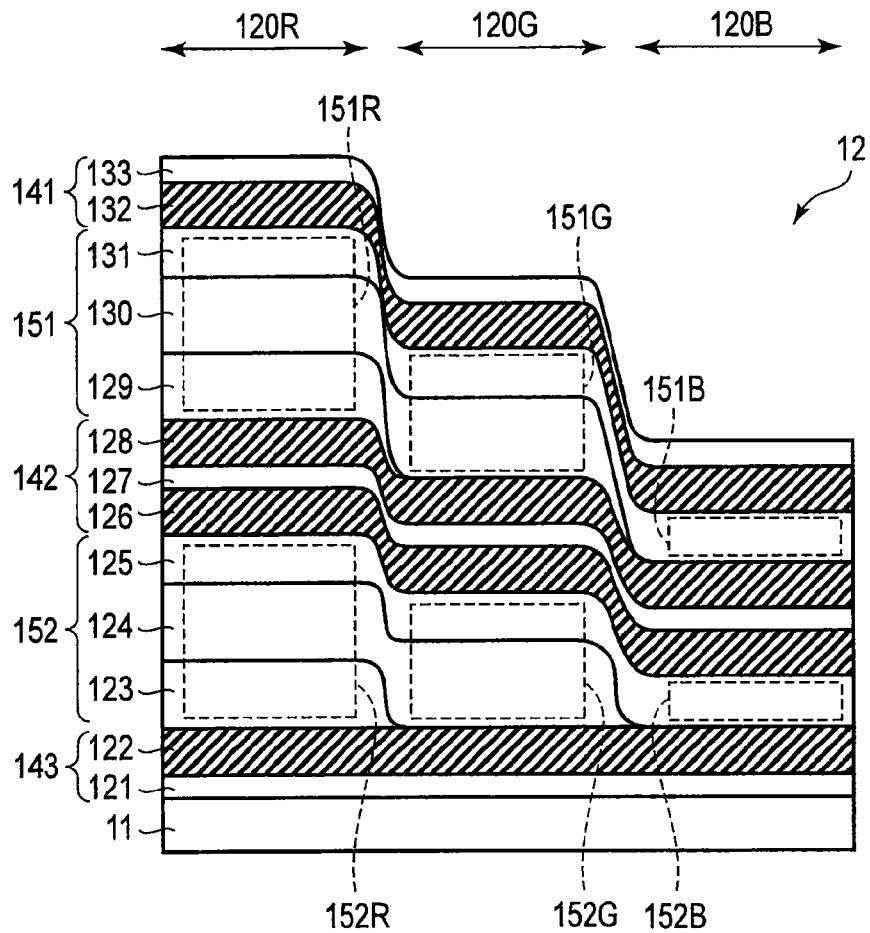
FIG. 6A is a sectional view showing an interference filter according to the first embodiment.

FIG. 6A is a sectional view showing the interference filter 12 of the display device according to the first embodiment. The interference filter 12 is formed from a plurality of stacked dielectric films 121 to 133. The interference filter 12 is formed by stacking, for example, the silicon oxide films 121, 123 to 125, 127, 129 to 131, and 133 and the silicon nitride films 122, 126, 128, and 132.

The red interference filter 120R, the green interference filter 120G, and the blue interference filter 120B include a first common layer 141 (132 and 133), a second common layer 142 (126, 127, and 128), and a third common layer (also called a coating layer) 143 (121 and 122). The first common layer 141 is a film that continues through interference filters 120R, 120G, and 120B. The second common layer 142 is a film that continues through interference filters 120R, 120G, and 120B. The third common layer 143 is a film that continues through interference filters 120R, 120G, and 120B. The second common layer 142 faces the first common layer 141.

Figure 6B:
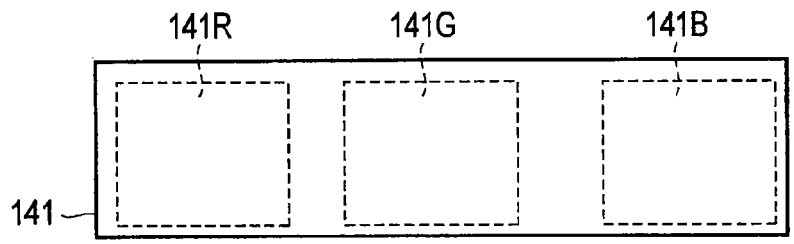
FIG. 6B is a plan view showing the interference filter according to the first embodiment.

FIG. 6B is a plan view showing the first common layer 141. The first common layer 141 includes a first region 141R to form the red interference filter 120R, a second region 141G to form the green interference filter 120G, and a third region 141B to form the blue interference filter 120B.

A first spacer layer 151 is provided between the first common layer 141 and the second common layer 142. A second spacer layer 152 faces the first spacer layer 151 through the second common layer 142. The third common layer 143 overlaps the second spacer layer 152 in a direction in which the first common layer 141, the first spacer layer 151, and the second common layer 142 are stacked.

The red interference filter 120R includes a red first spacer layer (also called a first portion) 151R (129, 130, and 131) that is part of the first spacer layer 151 between the first common layer 141 and the second common layer 142. The red interference filter 120R also includes a red second spacer layer (also called a third portion) 152R (123, 124, and 125) that is part of the second spacer layer 152 between the second common layer 142 and the third common layer 143. The green interference filter 120G includes a green first spacer layer (also called a second portion) 151G (130 and 131) that is part of the first spacer layer 151 between the first common layer 141 and the second common layer 142. The green interference filter 120G also includes a green second spacer layer (also called a fourth portion) 152G (124 and 125) that is part of the second spacer layer 152 between the second common layer 142 and the third common layer 143. The blue interference filter 120B includes a blue first spacer layer (also called a fifth portion) 151B (131) that is part of the first spacer layer 151 between the first common layer 141 and the second common layer 142. The blue interference filter 120B also includes a blue second spacer layer (also called a sixth portion) 152B (125) that is part of the second spacer layer 152 between the second common layer 142 and the third common layer 143.

The red first spacer layer 151R faces the first region 141R of the first common layer 141. The green first spacer layer 151G faces the second region 141G of the first common layer 141. The blue first spacer layer 151B faces the third region 141B of the first common layer 141. The red first spacer layer 151R, the green first spacer layer 151G, and the blue first spacer layer 151B have different thicknesses. The red first spacer layer 151R faces the red second spacer layer 152R. The green first spacer layer 151G faces the green second spacer layer 152G. The blue first spacer layer 151B faces the blue second spacer layer 152B. The red second spacer layer 152R, the green second spacer layer 152G, and the blue second spacer layer 152B have different thicknesses. Hence, the red interference filter 120R, the green interference filter 120G, and the blue interference filter 120B have different thicknesses.

In the present embodiment, the green first spacer layer 151G is thicker than the blue first spacer layer 151B, and the red first spacer layer 151R is thicker than the green first spacer layer 151G. In addition, the green second spacer layer 152G is thicker than the blue second spacer layer 152B, and the red second spacer layer 152R is thicker than the green second spacer layer 152G. Hence, the green interference filter 120G is thicker than the blue interference filter 120B, and the red interference filter 120R is thicker than the green interference filter 120G.

The interference filter 12 includes the second spacer layer and the third common layer in addition to the first common layer, the first spacer layer, and the second common layer, unlike the comparative example including the first common layer, the first spacer layer, and the second common layer. The first spacer layer 151 and the second spacer layer 152 are made of the same material. Note that the first spacer layer 151 and the second spacer layer 152 may be made of materials that are substantially identical but have slightly different composition ratios.

Figure 7A:
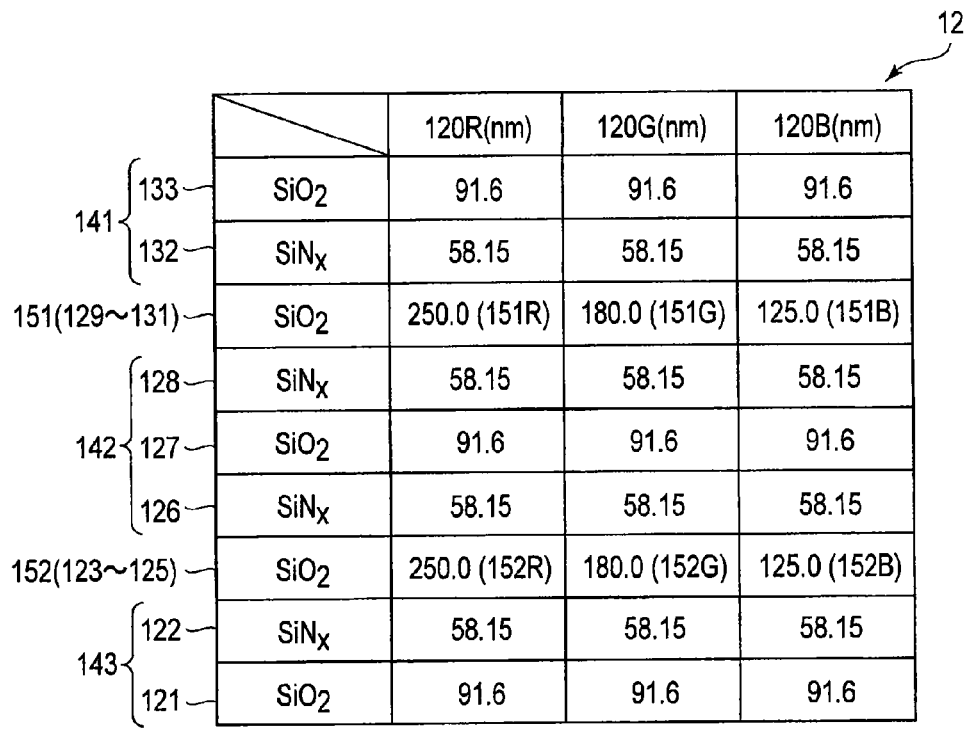
FIG. 7A is a view showing an example of the interference filter according to the first embodiment.
Figure 7B:
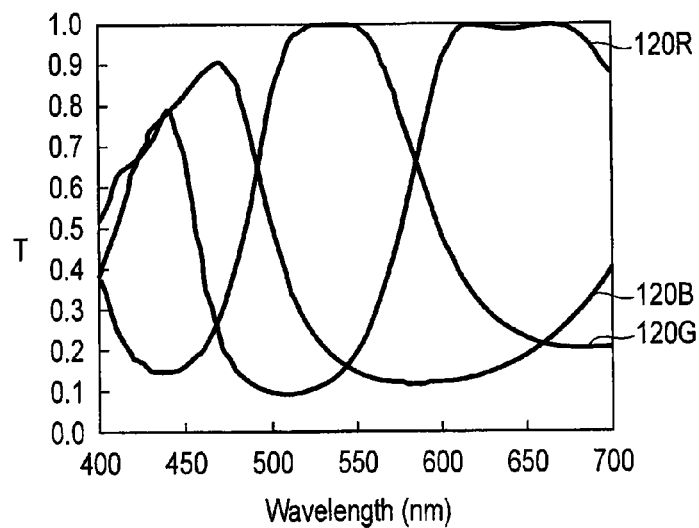
FIG. 7B is a view showing the light transmission characteristic of the interference filter shown in FIG. 7A.

FIG. 7A is a table showing an example of the interference filter according to the first embodiment. FIG. 7B is a graph showing the light transmission characteristic of the interference filter. As shown in FIG. 7A, in the example of the interference filter 12, the third common layer 143 is formed from the 91.6-nm-thick silicon oxide film 121 and the 58.15-nm-thick silicon nitride film 122 that are stacked. The red second spacer layer 152R is formed from a 250.0-nm-thick silicon oxide film, the green second spacer layer 152G is formed from a 180.0-nm-thick silicon oxide film, and the blue second spacer layer 152B is formed from a 125.0-nm-thick silicon oxide film. The second common layer 142 is formed from the 58.15-nm-thick silicon nitride film 126, the 91.6-nm-thick silicon oxide film 127, and the 58.15-nm-thick silicon nitride film 128 that are stacked. The red first spacer layer 151R is formed from a 250.0-nm-thick silicon oxide film, the green first spacer layer 151G is formed from a 180.0-nm-thick silicon oxide film, and the blue first spacer layer 151B is formed from a 125.0-nm-thick silicon oxide film. The first common layer 141 is formed from the 58.15-nm-thick silicon nitride film 132 and the 91.6-nm-thick silicon oxide film 133 that are stacked.

Each of the common layers 141, 142, and 143 may be formed by stacking a plurality of dielectric films. In the present embodiment, the common layers 141, 142, and 143 are formed by stacking silicon nitride films and silicon oxide films. The first common layer 141, the second common layer 142, and the third common layer 143 can have the same thickness or different thicknesses. In the present embodiment, the first common layer 141 and the third common layer 143 have the same thickness. In interference filters 120R, 120G, and 120B of all colors, the layers on the second common layer 142 and those under the second common layer 142 are symmetrical. Although the interference filter 12 is formed here by stacking the silicon oxide films and the silicon nitride films, dielectric films of another type may be used, or two or more kinds of dielectric films may be used. The thicknesses of the respective layers are not limited to those shown in FIG. 7A.

In FIG. 7B, the transverse axis represents the wavelength (unit: nm), and the vertical axis represents the transmittance of each interference filter shown in FIG. 7A. Each of interference filters 120R, 120G, and 120B of the respective colors shown in this example has a wide spectral bandwidth representing the transmission region. Hence, the red interference filter 120R transmits light in a wide wavelength region representing red. This also applies to the green interference filter 120G and the blue interference filter 120B. The transmittances of wavelength regions other than the transmission region are low, as compared to the light transmission characteristic of the comparative example shown in FIG. 2B. That is, in interference filters 120R, 120G, and 120B of the respective colors, the colors mix little. If an interference filter transmits light of a color other than a desired color, for example, if the red interference filter 120R transmits light of a color other than red as well, the light of the color other than red is absorbed by the absorption filter, resulting in a loss of light. On the other hand, if the transmittance of light of the color other than the desired color is low, as in the interference filter 12 of the present embodiment, the absorption filter 17 absorbs little light, resulting in little loss of light. That is, it is possible to obtain a display device that efficiently uses light from the backlight for display.

Alternatively, the display device may be provided with not the absorption filter but only the interference filter 12. Even then, the display device can display an image of a desired color and the display color can be improved since the colors mix little in interference filters 120R, 120G, and 120B of the respective colors.

When simulations are conducted using the interference filter shown in FIG. 7A, the ratio of efficiency to the conventional device is 1.65. The ratio of efficiency to the conventional device is a value representing the ratio of the efficiency of causing light emitted by the backlight to exit out of the liquid crystal panel when employing the display device according to the present embodiment to that when employing a display device without the interference filter. The upper limit of this value is 3 in principle. The larger the value is, the higher the efficiency is. On the other hand, when simulations are conducted using the interference filter shown in FIG. 3A, the ratio of efficiency to the conventional device is 1.40. The interference filter according to the present embodiment can efficiently transmit incident light and decrease the wavelength regions that cannot pass through the interference filter. For this reason, the loss of light is small.

FIG. 8 is a simulation chart showing the characteristics of the display device according to the first embodiment and the display device according to the comparative example. In FIG. 8, the transverse axis represents the recycle ratio that is the ratio of light that is reflected by the interference filter, returned to the backlight, reflected by the reflecting plate, and returned to the interference filter, and the vertical axis represents the ratio of efficiency to the conventional device. The ratio of efficiency of the display device according to the first embodiment to the conventional device is higher than that of the display device according to the comparative example at any recycle ratio.

As described above, the interference filter 12 of the present embodiment can widen the transmission region and improve the light utilization of the display device.

Providing the absorption filter 17 in the display device is optional. A case in which the absorption filter 17 is provided in addition to the interference filter 12 will be explained here.

FIG. 9 shows an example of the transmission characteristic of the absorption filter 17. In the absorption filter 17, the spectra 171, 172, and 173 of the respective colors are wide but overlap in the regions of low transmittances, and the color reproducibility is undesirable. In the present embodiment, however, light passes through the interference filter 12 and then enters the absorption filter 17. When the transmission spectrum of the absorption filter 17 is wider than that of the interference filter 12, most light components that have passed through the interference filter 12 pass the absorption filter 17. Out of the light that has passed through the interference filter 12, light components in the wavelength regions of low transmittances are absorbed by the absorption filter 17. For example, even when green light has passed through the red interference filter 120R, the red absorption filter 171 absorbs the light.

In the interference filter 12 shown in FIGS. 7A and 7B, the NTSC ratio representing the color gamut is about 30%. The NTSC ratio is high when the transmittance difference between the transmission region and a wavelength region other than the transmission region is large out of the light that passes through the interference filter 12. In the design of the interference filter 12, when the transmission region is widened, the transmittances of the wavelength regions other than the transmission region may also rise. For example, when the transmittance of the red wavelength region is raised in the red interference filter 120R, the transmittance in the green or blue wavelength region may also rise. In this case, the NTSC ratio becomes low.

On the other hand, the absorption filter 17 shown in FIG. 9 has an NTSC ratio of about 55%. When the interference filter 12 and the absorption filter 17 are used together, out of the light that has passed through the interference filter 12, light components outside the transmission region are absorbed by the absorption filter 17. Hence, the NTSC ratio can be improved. That is, when the interference filter 12 and the absorption filter 17 are used together, the interference filter 12 can prevent the loss of light of the backlight 40, and the absorption filter 17 can improve the NTSC ratio.

The interference filter 12 transmits and reflects light using the interferential action of light based on the arrangement of the optical thin film group. When the light obliquely passes through the interference filter 12, the optical path length is different from that when the light vertically passes through the interference filter 12. Hence, the spectrum of the transmitted light shifts to the short wavelength side with respect to the spectrum of incident light in principle. That is, the color of the transmitted light may change between a case in which the interference filter 12 is observed from the front and a case in which the interference filter 12 is observed obliquely. However, in the present embodiment in which the interference filter 12 and the absorption filter 17 are used together, even when the light that has passed through the interference filter 12 shifts to the short wavelength side, the absorption filter 17 absorbs the shifted light and thus suppresses the influence on the display color of the display device.

In addition, increasing the directivity of light emitted by the backlight 40 also enables to suppress the light that has passed through the interference filter from shifting to the short wavelength side. At this time, providing a light scattering member such as a light scattering plate in the liquid crystal panel 10 makes it possible to prevent the viewing angle from narrowing.

A method of manufacturing the interference filter according to the first embodiment will be described below. FIGS. 10A, 10B, 10C, 10D, 10E, 10F, 10G, 11A, 11B, 11C, 11D, and 11E are sectional views showing a method of manufacturing the interference filter of the display device shown in FIGS. 7A and 7B. First, the silicon oxide film 121 and the silicon nitride film 122 are formed on the support substrate 11 to form the third common layer 143. The silicon oxide film 123 is formed on the third common layer 143, as shown in FIG. 10A. A resist 134 is patterned by photolithography in a region of the silicon oxide film 123 where the red interference filter 120R is to be formed, as shown in FIG. 10B. The silicon oxide film 123 is patterned by chemical dry etching and left in the region where the red interference filter 120R is to be formed. After that, the resist 134 is removed, as shown in FIG. 100.

The silicon oxide film 124 is formed, as shown in FIG. 10D. A resist 135 is patterned by photolithography, as shown in FIG. 10E. The silicon oxide film 124 is patterned by chemical dry etching and left in the regions where the red interference filter 120R and the green interference filter 120G are to be formed. After that, the resist 135 is removed, as shown in FIG. 10F. The silicon oxide film 125 is then formed.

Next, the silicon nitride film 126, the silicon oxide film 127, and the silicon nitride film 128 are formed to form the second common layer 142, as shown in FIG. 10G. The layer between the third common layer 143 and the second common layer 142 is the second spacer layer 152.

The silicon oxide film 129 is formed on the second common layer 142, as shown in FIG. 11A. The silicon oxide film 129 is patterned by performing chemical dry etching using a resist and left in the region where the red interference filter 120R is to be formed. After that, the resist is removed, as shown in FIG. 11B.

The silicon oxide film 130 is formed, as shown in FIG. 11C. The silicon oxide film 130 is patterned by performing chemical dry etching using a resist and left in the regions where the red interference filter 120R and the green interference filter 120G are to be formed. After that, the resist is removed, as shown in FIG. 11D. The silicon oxide film 131 is then formed.

The silicon nitride film 132 and the silicon oxide film 133 are formed to form the first common layer 141, as shown in FIG. 11E. The layer between the second common layer 142 and the first common layer 141 is the first spacer layer 151.

These silicon nitride films and silicon oxide films can be formed by, for example, chemical vapor deposition (CVD) or sputtering.

Figure 12:
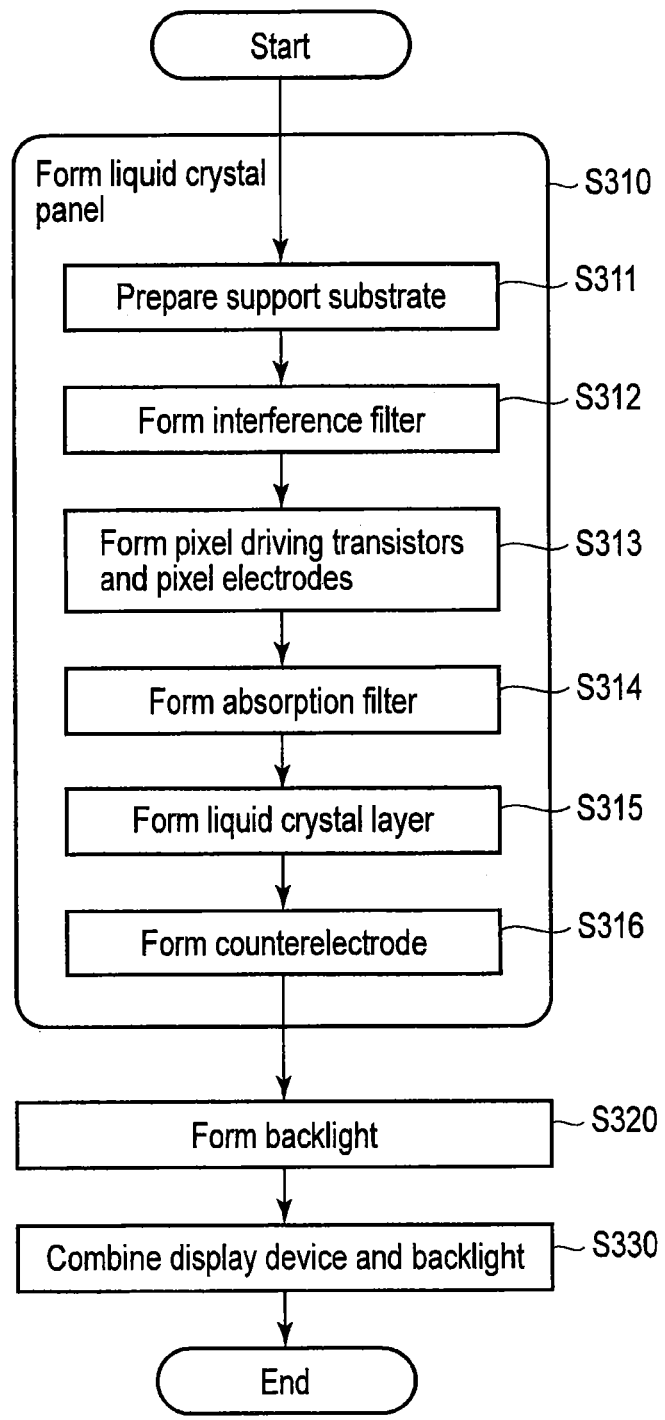
FIG. 12 is a flowchart showing a method of manufacturing the display device according to the first embodiment.

FIG. 12 is a flowchart showing a method of manufacturing the display device according to the first embodiment.

The display device manufacturing method includes step S310 of forming a liquid crystal panel, step S320 of forming a backlight, and step S330 of combing the liquid crystal panel and the backlight. Step S310 of forming the liquid crystal panel includes step S311 of preparing a support substrate, step S312 of forming an interference filter, step S313 of forming pixel driving transistors and pixel electrodes, step S314 of forming an absorption filter, step S315 of forming a liquid crystal layer, and step S316 of forming a counterelectrode.

In the arrangement of the interference filter 12 according to the present embodiment, each silicon oxide film may be replaced with a silicon nitride film, and each silicon nitride film may be replaced with a silicon oxide film. Adjusting the thickness of each film allows the red interference filter 120R to transmit red light, the green interference filter 120G to transmit green light, and the blue interference filter 120B to transmit blue light.

The arrangement of the interference filter 12 according to the present embodiment can be observed along its section when the liquid crystal panel is cut in a direction perpendicular to the support substrate 11. For example, this section can be observed using a scanning transmission electron microscope (STEM).

Note that in the present embodiment, when the first common layer 141, the second common layer 142, and the third common layer 143 have the same thickness, the transmittance near the center of the transmission region may be low. That is, the transmission spectrum may have two maximum values (peaks) in the transmission region. To prevent this, the first common layer 141 and the third common layer 143 are preferably made thinner than the second common layer 142.

Second Embodiment

Figure 13:
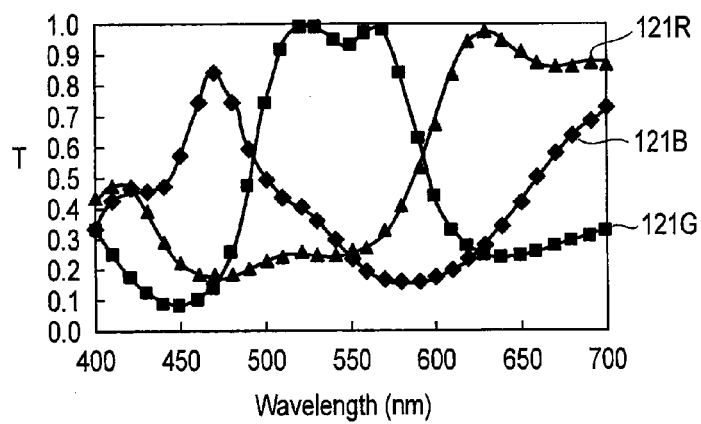
FIG. 13A is a view showing an example of an interference filter according to the second embodiment.
FIG. 13B is a view showing the light transmission characteristic of the interference filter shown in FIG. 13.

FIG. 13A is a table showing an example of an interference filter according to the second embodiment. FIG. 13B is a graph showing the light transmission characteristic of the interference filter shown in FIG. 13A. The transverse axis represents the wavelength (unit: nm) of light that passes through the interference filter, and the vertical axis represents a transmittance T.

In an interference filter 121 according to the present embodiment, a red interference filter 121R and a blue interference filter 121B include neither a third common layer 143 nor a second spacer layer 152. That is, only a green interference filter 121G includes the third common layer 143 and the second spacer layer 152. A second common layer 142, a first spacer layer 151, and a first common layer 141 are formed so as to cover the third common layer 143 and the second spacer layer 152.

The first common layer 141 and the second common layer 142 face each other. As in the first embodiment, the first common layer 141 includes a first region 141R, a second region 141G, and a third region 141B.

The first spacer layer 151 is provided between the first common layer 141 and the second common layer 142. A red first spacer layer 151R faces the first region 141R of the first common layer 141. A green first spacer layer 151G faces the second region 141G of the first common layer 141. A blue first spacer layer 151B faces the third region 141B of the first common layer 141. The red first spacer layer 151R, the green first spacer layer 151G, and the blue first spacer layer 151B have different thicknesses. The green first spacer layer 151G faces a green second spacer layer 152 through the second common layer 142. The third common layer 143 faces the second common layer 142 through the second spacer layer 152. Hence, the red interference filter 121R, the green interference filter 121G, and the blue interference filter 121B have different thicknesses. The second common layer 142 is continuously provided so as to face the red first spacer layer 151R, the green first spacer layer 151G, and the blue first spacer layer 151B.

In the present embodiment, the blue first spacer layer 151B is thicker than the red first spacer layer 151R, and the green first spacer layer 151G is thicker than the blue first spacer layer 151B. Hence, the blue interference filter 121B is thicker than the red interference filter 121R, and the green interference filter 121G is thicker than the blue interference filter 121B.

More specifically, the third common layer 143 is provided on a support substrate (not shown). The third common layer 143 includes a silicon nitride film 161 and a silicon oxide film 162. The second spacer layer 152 is provided on the third common layer 143 and formed from a silicon nitride film. The second common layer 142 is provided on the second spacer layer 152 and the support substrate, and includes a silicon nitride film 163, a silicon oxide film 164, a silicon nitride film 165, and a silicon oxide film 166. The first spacer layer 151 is provided on the second common layer 142 and formed from a silicon nitride film. The first common layer 141 is provided on the first spacer layer, and includes a silicon oxide film 167, a silicon nitride film 168, and a silicon oxide film 169. The films have thicknesses as shown in FIG. 13A.

Each of the red interference filter 121R and the blue interference filter 121B is formed from the first common layer 141, the second common layer 142, and the first spacer layer 151 provided between them, like the interference filter 200 according to the comparative example shown in FIG. 1. On the other hand, the green interference filter 121G includes the first common layer 141, the second common layer 142, and the third common layer 143, and the first spacer layer 151 provided between the first common layer 141 the second common layer 142, and the second spacer layer 152 provided between the second common layer 142 and the third common layer 143, like the interference filter 12 according to the first embodiment.

In the present embodiment, both the second spacer layer 152 and a layer (silicon nitride film 163) out of the second common layer 142, which is in contact with the second spacer layer 152, are formed from silicon nitride films. A portion (silicon nitride film 163) having the same thickness in interference filters 121R, 121G, and 121B of the respective colors is the second common layer 142, and the remaining portion (silicon nitride film 152) is the second spacer layer 152.

Out of red, green, and blue, the wavelength region of green is located at the center. Hence, when the wavelength region of light that passes through the green interference filter 121G is widened, the amount of light that passes through the interference filter can be increased, and wavelength regions that do not pass through the interference filter can be reduced.

When simulations are conducted for the interference filter 121 shown in FIG. 13A, the ratio of efficiency to the conventional device is 1.55. In the second embodiment as well, the amount of light that passes through the interference filter can advantageously be increased, as compared to the comparative example, and wavelength regions that do not pass through the interference filter can be reduced.

According to the present embodiment as well, it is possible to obtain an interference filter having a wide transmission region and little loss of light.

The interference filter of the present embodiment can also be used in a display device, like the interference filter of the first embodiment.

In the present embodiment, only the green interference filter 121G is provided with the third common layer 143 and the second spacer layer 152. However, for example, only the red interference filter 121R, only the blue interference filter 121B, or the interference filters of arbitrary two colors may be provided with the third common layer 143 and the second spacer layer 152.

Third Embodiment

FIG. 14A is a table showing an example of an interference filter 122 according to the third embodiment. FIG. 14B is a graph showing the light transmission characteristic of the interference filter 122 shown in FIG. 14A. The transverse axis represents the wavelength (unit: nm) of light that passes through the interference filter, and the vertical axis represents a transmittance T.

In an interference filter 122 according to the present embodiment, a red interference filter 122R and a blue interference filter 122B include neither a third common layer 143 nor a second spacer layer 152. That is, only a green interference filter 122G includes the third common layer 143 and the second spacer layer 152. A first common layer 141 is provided on a support substrate (not shown).

The first common layer 141 and a second common layer 142 face each other. As in the first embodiment, the first common layer 141 includes a first region 141R, a second region 141G, and a third region 141B. A first spacer layer 151 is provided between the first common layer 141 and the second common layer 142. A red first spacer layer 151R faces the first region 141R of the first common layer 141. A green first spacer layer 151G faces the second region 141G of the first common layer 141. A blue first spacer layer 151B faces the third region 141B of the first common layer 141. The red first spacer layer 151R, the green first spacer layer 151G, and the blue first spacer layer 151B have different thicknesses. The green first spacer layer 151G faces a second spacer layer 152 through the second common layer 142. The third common layer 143 faces the second common layer 142 through the second spacer layer 152. Hence, the red interference filter 122R, the green interference filter 122G, and the blue interference filter 122B have different thicknesses. The second common layer is continuously provided so as to facing the red first spacer layer 151R, the green first spacer layer 151G, and the blue first spacer layer 151B.

In the present embodiment, the blue first spacer layer 151B is thicker than the red first spacer layer 151R, and the green first spacer layer 151G is thicker than the blue first spacer layer 151B. Hence, the blue interference filter 122B is thicker than the red interference filter 122R, and the green interference filter 122G is thicker than the blue interference filter 122B.

More specifically, the first common layer 141 is provided on the support substrate (not shown). The first common layer 141 includes a silicon oxide film 171, a silicon nitride film 172, and a silicon oxide film 173. The first spacer layer 151 is provided on the first common layer 141 and formed from a silicon nitride film. The second common layer 142 is provided on the first spacer layer 151, and includes a silicon oxide film 174, a silicon nitride film 175, a silicon oxide film 176, and a silicon nitride film 177. The second spacer layer 152 is provided on the second common layer 142 and formed from a silicon nitride film. The third common layer 143 is provided on the second spacer layer 152, and includes a silicon oxide film 178, a silicon nitride film 179, and a silicon oxide film 180. The films have thicknesses as shown in FIG. 14A.

Each of the red interference filter 122R and the blue interference filter 122B is formed from the first common layer 141, the second common layer 142, and the first spacer layer 151 provided between them, like the interference filter 200 according to the comparative example shown in FIG. 1. On the other hand, the green interference filter 122G includes the first common layer 141, the second common layer 142, and the third common layer 143, the first spacer layer 151 provided between the first common layer 141 and the second common layer 142, and the second spacer layer 152 provided between the second common layer 142 and the third common layer 143, like the interference filter 12 according to the first embodiment.

In the present embodiment, both the second spacer layer 152 and a layer (silicon nitride film 177) out of the second common layer 142, which is in contact with the second spacer layer 152, are formed from silicon nitride films. Out of the silicon nitride films, a portion (silicon nitride film 177) having the same thickness in the interference filters 122R, 122G, and 122B of the respective colors is the second common layer 142, and the remaining portion (silicon nitride film 151) is the first spacer layer 151.

Out of red, green, and blue, the wavelength region of green is located at the center. Hence, when the wavelength region of light that passes through the green interference filter 122G is widened, the amount of light that passes through the interference filter can be increased, and wavelength regions of light that do not pass through the interference filter can be reduced.

When simulations are conducted for the interference filter 122 shown in FIG. 14A, the ratio of efficiency to the conventional device is 1.64. In the third embodiment as well, the amount of light that passes through the interference filter can advantageously be increased, as compared to the comparative example, and wavelength regions that do not pass through the interference filter can be reduced.

According to the present embodiment as well, it is possible to obtain an interference filter having a wide transmission region and little loss of light.

The interference filter of the present embodiment can also be used in a display device, like the interference filter of the first embodiment.

In the present embodiment, only the green interference filter 122G is provided with the third common layer 143 and the second spacer layer 152. However, for example, only the red interference filter 122R, only the blue interference filter 122B, or the interference filters of arbitrary two colors may be provided with the third common layer 143 and the second spacer layer 152.

According to at least one embodiment described above, there are provide an interference filter having a wide transmission region, a display device including the interference filter, and method of manufacturing the display device.

The embodiments are described above with reference to detailed examples. However, the embodiments are not limited to those detailed examples. For example, detailed arrangements of elements such as a light guide plate, a prism row portion, a prism member, a high-refractive-index layer, a low-refractive-index layer, and a deflecting portion included in the light guide member, and a light source included in a surface light source are incorporated in the embodiment as far as those skilled in the art can similarly practice the embodiment and obtain the same effects as described above by appropriately selecting the elements from a known scope.

In addition, a combination of two or more detailed examples within the technical scope is also incorporated in the embodiment as far as it incorporates the gist of the embodiment.

All light guide members and surface light sources those skilled in the art can practice by changing the designs of the light guide member and the surface light source described as the embodiments are also incorporated in the embodiment as far as they incorporate the gist of the embodiment.

In addition, those skilled in the art can anticipate various changes and modifications within the ideological scope of the embodiment, and the changes and modifications are also incorporated in the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
an interference filter comprising:
　a first common layer comprising a first region, a second region, and a third region;
　a second common layer facing the first common layer;
　a first spacer layer provided between the first common layer and the second common layer and comprising a first portion facing the first region, a second portion facing the second region, and a third portion facing the third region, the first portion having a first thickness, the second portion having a second thickness different from the first thickness, the third portion having a third thickness different from the first thickness and the second thickness;
　a second spacer layer comprising a fourth portion facing the first portion through the second common layer, a fifth portion facing the second portion through the second common layer, and a sixth portion facing the third portion through the second common layer, the second spacer layer being made of a same material as a material of the first spacer layer;
　a coating layer comprising a seventh portion facing the fourth portion, an eighth portion facing the fifth portion, and a ninth portion facing the sixth portion; and
a display layer facing the interference filter,
wherein:
each of the first common layer, the first spacer layer, the second common layer, the second spacer layer, and the coating layer is formed from a dielectric film; and
one or two of the following conditions is satisfied:
　a total thickness of the fourth portion and the seventh portion is zero;
　a total thickness of the fifth portion and the eighth portion is zero; and
　a total thickness of the sixth portion and the ninth portion is zero.

2. The device according to claim 1, wherein the second common layer is continuously provided to face the first portion, the second portion, and the third portion.

3. The device according to claim 1, wherein the first thickness is greater than the second thickness.

4. The device according to claim 1, wherein the first thickness is greater than the third thickness.

5. The device according to claim 1, wherein:
the interference filter comprises a first interference filter portion including the first region of the first common layer, a second interference filter portion including the second region of the first common layer, and a third interference filter portion including the third region of the first common layer;
the first interference filter portion is configured to transmit light in a first wavelength region and to reflect light in a wavelength region other than the first wavelength;
the second interference filter portion is configured to transmit light in a second wavelength region different from the first wavelength region and to reflect light in a wavelength region other than the second wavelength region; and the third interference filter portion is configured to transmit light in a third wavelength region different from the first wavelength region and the second wavelength region and to reflect light in a wavelength region other than the third wavelength region.

6. The device according to claim 1, wherein a portion where one of
the total thickness of the fourth portion and the seventh portion,
the total thickness of the fifth portion and the eighth portion, and
the total thickness of the sixth portion and the ninth portion,
is not zero, transmits green light.

7. The device according to claim 1, further comprising an absorption filter facing the interference filter through the display layer.

8. The device according to claim 1, wherein the display layer is a liquid crystal layer.

9. An interference filter, comprising:
a first common layer comprising a first region, a second region, and a third region;
a second common layer facing the first common layer;
a first spacer layer provided between the first common layer and the second common layer and comprising a first portion facing the first region, a second portion facing the second region, and a third portion facing the third region, the first portion having a first thickness, the second portion having a second thickness different from the first thickness, the third portion having a third thickness different from the first thickness and the second thickness;
a second spacer layer comprising a fourth portion facing the first portion through the second common layer, a fifth portion facing the second portion through the second common layer, and a sixth portion facing the third portion through the second common layer, the second spacer layer being made of a same material as a material of the first spacer layer; and
a coating layer comprising a seventh portion facing the fourth portion, an eighth portion facing the fifth portion, and a ninth portion facing the sixth portion,
wherein:
each of the first common layer, the first spacer layer, the second common layer, the second spacer layer, and the coating layer is formed from a dielectric film; and
one or two of the following conditions is satisfied:
a total thickness of the fourth portion and the seventh portion is zero;
a total thickness of the fifth portion and the eighth portion is zero; and
a total thickness of the sixth portion and the ninth portion is zero.

10. The interference filter according to claim 9, wherein the second common layer is continuously provided to face the first portion, the second portion, and the third portion.

11. The interference filter according to claim 9, wherein the first thickness is greater than the second thickness.

12. The interference filter according to claim 9, wherein the first thickness is greater than the third thickness.

13. The interference filter according to claim 9, comprising a first interference filter portion including the first region of the first common layer, a second interference filter portion including the second region of the first common layer, and a third interference filter portion including the third region of the first common layer,
wherein:
the first interference filter portion is configured to transmit light in a first wavelength region and to reflect light in a wavelength region other than the first wavelength;
the second interference filter portion is configured to transmit light in a second wavelength region different from the first wavelength region and to reflect light in a wavelength region other than the second wavelength region; and
the third interference filter portion is configured to transmit light in a third wavelength region different from the first wavelength region and the second wavelength region and to reflect light in a wavelength region other than the third wavelength region.

14. The interference filter according to claim 9, wherein a portion where one of
the total thickness of the fourth portion and the seventh portion,
the total thickness of the fifth portion and the eighth portion, and
the total thickness of the sixth portion and the ninth portion,
is not zero, transmits green light.

15. A display device manufacturing method, comprising:
forming an interference filter, the interference filter comprising:
a first common layer comprising a first region, a second region, and a third region;
a second common layer facing the first common layer;
a first spacer layer provided between the first common layer and the second common layer and comprising a first portion facing the first region, a second portion facing the second region, and a third portion facing the third region, the first portion having a first thickness, the second portion having a second thickness different from the first thickness, the third portion having a third thickness different from the first thickness and the second thickness;
a second spacer layer comprising a fourth portion facing the first portion through the second common layer, a fifth portion facing the second portion through the second common layer, and a sixth portion facing the third portion through the second common layer, the second spacer layer being made of a same material as a material of the first spacer layer; and
a coating layer comprising a seventh portion facing the fourth portion, an eighth portion facing the fifth portion, and a ninth portion facing the sixth portion,
wherein:
each of the first common layer, the first spacer layer, the second common layer, the second spacer layer, and the coating layer is formed from a dielectric film; and
one or two of the following conditions is satisfied:
a total thickness of the fourth portion and the seventh portion is zero;
a total thickness of the fifth portion and the eighth portion is zero; and
a total thickness of the sixth portion and the ninth portion is zero; and
forming a display layer facing the interference filter.

* * * * *